Oct. 11, 1932.   C. H. NEHLS   1,881,866
BOLT LOCK
Filed Feb. 16, 1931
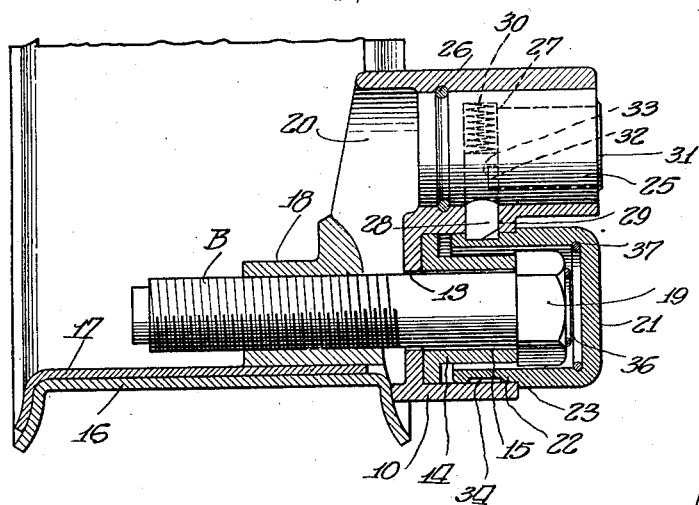

Patented Oct. 11, 1932

1,881,866

UNITED STATES PATENT OFFICE

CHARLES H. NEHLS, OF NORTH CHICAGO, ILLINOIS, ASSIGNOR TO OAKES PRODUCTS CORPORATION, OF NORTH CHICAGO, ILLINOIS, A CORPORATION OF MICHIGAN

BOLT LOCK

Application filed February 16, 1931. Serial No. 516,008.

This invention relates to lock structure for association with bolts for concealing and rendering a bolt inaccessible to the application of tools or otherwise after the bolt has been operated to secure together two or more elements whose separation by unauthorized persons is to be prevented, the invention being particularly useful in the automobile field for guarding against the unlawful removal of spare parts from supports on the automobile body as for example spare tires or wheels.

The lock structure of my invention comprises a body adapted to receive a bolt between a head thereon and one of a number of elements to be secured together, from one of which elements the bolt extends or to which the bolt is adapted to be secured, with the provision of an enclosing cap or guard for the bolt head, and key controlled lock means for locking the cap in position, the features of the structure being the ready accessibility outside of the lock structure body of the bolt head by tools such as wrenches.

The various features of my invention are disclosed on the accompanying drawing, on which Figure 1 is a front elevation of the lock structure;

Figure 2 is a section on plane II—II of Figure 1 of the lock structure and a tire rim and carrier ring; and Figure 3 is a similar section showing a modified arrangement.

The lock structure comprises a body 10 having at one end a cylindrical chamber or pocket 11 through the bottom wall 12 of which is the passageway 13 for receiving the shank of a bolt B. Within the pocket is a bushing 14 having a passageway 15 registering with the passageway 13 for receiving the bolt shank, the end of the bushing being flush with or outside of the front face of the body 10. The bushing may be detachable from the pocket or may be secured therein by friction or other means, or may be formed integral with the body 10.

I have shown my lock structure applied for securing a tire rim 16 to the ring 17 of a spare wheel tire which ring in practice is suitably secured on the body of an automotive vehicle. In the arrangement of Figure 2 the carrier ring has a lug 18 secured thereto and which is threaded to receive the threaded end of the bolt shank which has a head 19 integral therewith. After the tire is applied to the ring 17, this shank of the bolt is inserted through the bushing and back wall passageways 13 and 15 and the bolt is turned by means of a wrench applied to the head, the bolt head eventually abutting against the outer end of the bushing and so drawing the lock body against the rim to securely seat the rim on the ring and to thereafter lock it against removal, the lock structure body having the flange or extension 20 on its rear side shaped to properly fit the rim and the lug 18.

In the arrangement of Figure 3 the bolt shank at its inner end is rigidly secured in the lug 18′ secured to the ring 17 and its outer end is threaded for the reception of a head 19′ in the form of a nut. With this arrangement the lock body is applied over the threaded end of the bolt shank and against the tire rim to be secured and the nut is then applied to the threaded end of the shank to abut against the bushing and to thus clamp the lock structure into position to lock the rim to the carrier ring.

It will be noted that the bolt head will be entirely outside of the front face of the frame 10 so as to be readily accessible for the application of wrenches or other tools. For enclosing the bolt head to prevent the application of tools thereto I provide a cylindrical cap 21 whose inner diameter is greater than the greatest width of the bolt head and whose inner end 22 is of reduced external diameter so as to fit into the pocket 11 and to provide a shoulder 23 for engaging against the outer face of the frame 10. The bushing 14 is of reduced external diameter at its outer end to provide clearance space for the cap, the cap when applied in the pocket 11 entirely enclosing the bolt head.

Adjacent to the pocket 11 the body 10 has the cylindrical passageway or space 24 parallel with the pocket 11 and in this space a lock cylinder 25 is secured as by means of a ring key 26.

The lock cylinder is of ordinary well known construction and has the diametrally extending guide channel 27 for a lock bolt 28 which is adapted to be projected through the opening 29 into the pocket 11. A spring 30 may be used tending to force the lock bolt out. The lock cylinder barrel 31 has the cam 32 engaging in a transverse notch 33 in the lock bolt so that when the lock barrel is turned by means of a suitable key the bolt may be retracted.

The end 22 of the enclosing cap has the circumferential locking groove 34 which registers with the opening 31 when the cap has been fully inserted with its shoulder 23 abutting against the front of the body 10 and the lock bolt has its front edge beveled as indicated at 35 so that when the cap is inserted it will slide past the lock bolt whereafter the inner edge of the lock bolt will be in front of the rear shoulder of the locking groove 34 and the cap will be locked against removal. The locking groove extending circumferentially around the cap the cap will be free to turn in the pocket 11 but will be locked against axial displacement, thus protecting the bolt head against unlawful application of a tool and preventing theft.

To prevent rattling of the cap I preferably provide a spring 36 at the inner end of the cap for abutting against the bolt head when the cap is applied and to be compressed to hold the cap against rattling. The spring may hold itself in the cap by engaging in the circumferential channel 37 provided in the cap wall. In the arrangement of Figure 3 where the bolt head is in the form of a nut threaded onto the bolt shank, the spring is preferably of a diameter to receive the outer end of the shank as clearly shown in Figure 3.

When it is desired to remove the lock structure, a key is inserted in the lock cylinder and turned to retract the locking bolt whereupon the unlocked cap may be withdrawn from the pocket 11. The bolt head is then fully accessible at the outside of the lock body 10 for the application of a wrench or other tool so that the entire bolt (Figure 2) or the removable head (Figure 3) may be withdrawn whereafter the lock structure may be removed and the tire rim will be free to be removed from the carrier ring.

From a manufacturing standpoint it is more economical to have the bushing part 14 a separate element, although it is to be understood that this part could be integral with the body 10 in which case the bolt head would engage against the outer face of the body and an annular pocket would be formed in the body for receiving the outer end of the cap.

Other changes and modifications may be made without departing from the scope and spirit of the invention as defined in the appended claims.

I claim as follows:

1. A lock structure for association with a bolt having a head, said structure comprising a body having a passageway therethrough for receiving the shank of a bolt and the outer face of said body forming an abutment for a head on said shank, said body having an annular pocket concentric with and surrounding said passageway, a cap fitting in said annular pocket for enclosing the head of the bolt, said cap having a circumferential locking channel located within said pocket when said cap is applied therein, a locking cylinder supported by said body and a locking bolt extending from said lock cylinder into said pocket and said locking channel to lock said cap against removal.

2. A lock structure for association with a bolt having a head, said structure comprising a body having a pocket whose bottom wall has a passage for a bolt shank, a bushing within said pocket having a passageway therethrough registering with said bottom wall passage for receiving a bolt shank, the outer end of said bushing forming an abutment for a bolt head, there being a passageway between said bushing and the wall of said chamber, a cap adapted to engage in said passageway and to enclose a head on said shank, and key controlled locking means supported on said body and operable to lock said cap in said passage.

3. A lock structure having a passageway therethrough for receiving the shank of a bolt, there being an annular chamber in said lock structure concentric with and surrounding said passageway, a cylindrical cap extending into said chamber to receive the head on a bolt extending through said passageway, said cap having a circumferential locking channel, a lock cylinder having a lock bolt projecting into said chamber for engagement in said locking channel to lock said cap in said chamber, said lock structure being key operable to release said locking bolt from said cap.

In testimony whereof I have hereunto subscribed my name at North Chicago, Lake County, Illinois.

CHARLES H. NEHLS.